United States Patent
Appachi gounder et al.

(10) Patent No.: US 12,244,452 B1
(45) Date of Patent: *Mar. 4, 2025

(54) NETWORK MONITORING AND HEALING BASED ON A BEHAVIOR MODEL

(71) Applicant: Google LLC, Mountain View, CA (US)

(72) Inventors: Arivudainambi Appachi gounder, San Jose, CA (US); Parthasarathi Palanisamy, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,299

(22) Filed: Mar. 4, 2024

Related U.S. Application Data

(63) Continuation of application No. 18/199,997, filed on May 22, 2023, now Pat. No. 11,956,117.

(51) Int. Cl.
| | |
|---|---|
| *G06F 15/16* | (2006.01) |
| *H04L 41/0604* | (2022.01) |
| *H04L 41/0631* | (2022.01) |
| *H04L 41/16* | (2022.01) |

(52) U.S. Cl.
CPC ...... *H04L 41/0631* (2013.01); *H04L 41/0627* (2013.01); *H04L 41/16* (2013.01)

(58) Field of Classification Search
CPC .. H04L 41/0627; H04L 41/0631; H04L 41/16
USPC ........................................................ 709/224
See application file for complete search history.

(56) References Cited

U.S. PATENT DOCUMENTS

| | | | |
|---|---|---|---|
| 1,189,679 A * | 7/1916 | Furey | F16G 11/10 D8/383 |
| 7,010,593 B2 | 3/2006 | Raymond | |
| 7,552,199 B2 * | 6/2009 | Pomerantz | G06Q 10/06 709/219 |
| 7,568,227 B2 * | 7/2009 | Lyle | H04L 63/1416 714/39 |
| 8,004,962 B2 | 8/2011 | Yang et al. | |
| 8,238,263 B2 * | 8/2012 | Kohout | H04L 43/0817 370/252 |
| 9,306,965 B1 | 4/2016 | Grossman et al. | |
| 9,553,780 B1 | 1/2017 | Bullukian et al. | |
| 9,565,203 B2 | 2/2017 | Bernstein et al. | |
| 9,747,551 B2 | 8/2017 | Wang et al. | |
| 9,922,124 B2 | 3/2018 | Rathod | |

(Continued)

FOREIGN PATENT DOCUMENTS

| | | |
|---|---|---|
| CN | 108923975 B | 8/2021 |
| EP | 3416003 A1 | 12/2018 |

(Continued)

OTHER PUBLICATIONS

Extended European Search Report for European Patent Application No. 23213217.5 dated Apr. 29, 2024. 10 pages.

*Primary Examiner* — Moustafa M Meky
(74) *Attorney, Agent, or Firm* — Lerner David LLP

(57) ABSTRACT

Aspects of the disclosure are directed to monitoring, alerting, and/or root causing network problems based on current network behavior and network events at any instant in time using a network behavior model. The network behavior model can learn and be updated with network states and events to correlate network problems and determine root causes of the network problems for alerting and/or automatic correction.

20 Claims, 6 Drawing Sheets

(56) References Cited

U.S. PATENT DOCUMENTS

| | | | |
|---|---|---|---|
| 9,979,606 | B2 | 5/2018 | Gupta et al. |
| 10,069,676 | B2 | 9/2018 | Koponen et al. |
| 10,135,848 | B2 | 11/2018 | Muddu et al. |
| 10,264,435 | B2 | 4/2019 | Erdmann et al. |
| 10,419,469 | B1 | 9/2019 | Singh et al. |
| 10,708,795 | B2 | 7/2020 | Tapia |
| 10,735,285 | B2 | 8/2020 | Verma et al. |
| 10,771,488 | B2 | 9/2020 | Verma et al. |
| 10,949,534 | B2 | 3/2021 | Martin et al. |
| 11,140,129 | B2 | 10/2021 | Arnoth et al. |
| 11,218,391 | B2 * | 1/2022 | Singh ................ H04L 67/1097 |
| 11,245,600 | B2 * | 2/2022 | Pasha ................ H04L 41/064 |
| 11,469,992 | B2 | 10/2022 | Gerstel |
| 11,558,268 | B2 * | 1/2023 | Pasha ................ G06F 11/3442 |
| 11,570,139 | B2 | 1/2023 | Volynkin et al. |
| 11,743,151 | B2 * | 8/2023 | Safavi ................ H04L 43/16 |
| | | | 709/224 |
| 11,811,638 | B2 * | 11/2023 | Wang ................ H04L 41/5009 |
| 11,894,679 | B2 * | 2/2024 | Pathak ................ H02H 1/0092 |
| 11,956,117 | B1 * | 4/2024 | Appachi gounder ... H04L 41/16 |
| 2002/0124187 | A1 * | 9/2002 | Lyle ................ H04L 63/1408 |
| | | | 709/224 |
| 2012/0041858 | A1 | 2/2012 | Lewis |
| 2012/0294173 | A1 * | 11/2012 | Su ................ H04W 56/0045 |
| | | | 370/252 |
| 2015/0127628 | A1 | 5/2015 | Rathod |
| 2020/0267120 | A1 | 8/2020 | Arnoth et al. |
| 2021/0365835 | A1 | 11/2021 | Baumard |
| 2021/0385135 | A1 | 12/2021 | Côté et al. |
| 2022/0070141 | A1 | 3/2022 | Volynkin et al. |
| 2023/0012220 | A1 * | 1/2023 | Humphrey ........ H04L 63/1425 |
| 2023/0012609 | A1 * | 1/2023 | Wang ................ H04L 43/10 |
| 2023/0015709 | A1 * | 1/2023 | Bisht ................ H04L 43/0876 |
| 2023/0209113 | A1 * | 6/2023 | Mang ................ H04L 41/0654 |
| | | | 725/144 |
| 2023/0319115 | A1 | 10/2023 | Shah et al. |
| 2023/0362075 | A1 * | 11/2023 | Safavi ................ H04L 43/16 |
| 2024/0007350 | A1 * | 1/2024 | Gupta ................ H04L 41/0893 |
| 2024/0146054 | A1 * | 5/2024 | Pathak ................ H02J 13/0004 |

FOREIGN PATENT DOCUMENTS

| | | |
|---|---|---|
| WO | 2014088912 A1 | 6/2014 |
| WO | 2020252635 A1 | 12/2020 |

* cited by examiner

NETWORK MONITORING AND HEALING BASED ON A BEHAVIOR MODEL

CROSS-REFERENCE TO RELATED APPLICATION

The present application is a continuation of U.S. patent application Ser. No. 18/199,997 filed May 22, 2023, the disclosures of which is hereby incorporated herein by reference.

BACKGROUND

A network monitoring and alerting system can monitor individual network elements and events either directly or through an element management system. The network monitoring and alerting system can create alerts for the individual network elements and events based on monitored data. From the alerts, tickets can be generated for corrective action to be taken. However, the alerts either are not correlated or are correlated based on prior, static knowledge, which causes assessing network behavior and impact from the alerts to be highly difficult due to the complexity and distributive nature of a network. Uncorrelated or statically correlated alerts can also result in manual and time consuming root cause analysis, even for simple failures in a network.

BRIEF SUMMARY

Aspects of the disclosure are directed to monitoring, alerting, and/or determining root causes for network problems based on current network behavior and network events at any instant in time using a network behavior model. The network behavior model can learn and be updated with network states and events to correlate network problems and determine root causes of the network problems for alerting and/or automatic correction. Managing the network using the network behavior model can minimize time and effort involved in identifying and correcting root causes of network problems. The behavior model can further save computing resources, such as memory usage or processing power, by more quickly identifying root causes of network problems. This can be because quick identification and correction of root causes can result in network equipment that is operating at a diminished capacity or that is not online at all to be restored to its original processing/memory usage capacity.

An aspect of the disclosure provides for a method for managing a network using a behavior model, including: receiving, by one or more processors, first network metadata; comparing, by the one or more processors, the first network metadata to test network metadata; determining, by the one or more processors, that the first network metadata does not match the test network metadata; identifying, by the one or more processors, second network metadata that match the test network metadata; computing, by the one or more processors, a plurality of network events based on possible transitions from the first network metadata to the second network metadata; identifying, by the one or more processors, a root cause for the first network metadata not matching the test network metadata based on the plurality of network events; and outputting, by the one or more processors, instructions based on the root cause.

In an example, the first network metadata includes at least one of network states or behaviors at a point in time and the test network metadata includes at least one of desired network states or behaviors for the network. In another example, outputting instructions further includes at least one of sending an alert or notification to validate the root cause or automatically correcting the root cause. In yet another example, the second network metadata includes at least one of network states or behaviors that are affecting the first network metadata.

In yet another example, the behavior model includes at least one of a finite state machine or a machine learning model. In yet another example, the method further includes generating, by the one or more processors, a directed graph for the behavior model, the directed graph comprising a plurality of nodes and a plurality of edges connecting the plurality of nodes, the plurality of nodes representing network metadata and the plurality of edges representing network events. In yet another example, computing the plurality of network events further includes parsing edges from the node including the second network metadata to the node including the first network metadata. In yet another example, identifying the root cause further includes filtering the plurality of network events based on changes to the network or predicting the root cause based on previous network metadata or network events.

In yet another example, the method further includes training, by the one or more processors, the behavior model on previous network events, previous network metadata, and network objectives.

Another aspect of the disclosure provides for a system including: one or more processors; and one or more storage devices coupled to the one or more processors and storing instructions that, when executed by the one or more processors, cause the one or more processors to perform operations for managing a network using a behavior model, the operations including: receiving first network metadata; comparing the first network metadata to test network metadata; determining that the first network metadata does not match the test network metadata; identifying second network metadata that match the test network metadata; computing a plurality of network events based on possible transitions from the first network metadata to the second network metadata; identifying a root cause for the first network metadata not matching the test network metadata based on the plurality of network events; and outputting instructions based on the root cause.

In an example, outputting instructions further includes at least one of sending an alert or notification to validate the root cause or automatically correcting the root cause.

In another example, the operations further include generating a directed graph for the behavior model, the directed graph comprising a plurality of nodes and a plurality of edges connecting the plurality of nodes, the plurality of nodes representing network metadata and the plurality of edges representing network events. In yet another example, computing the plurality of network events further includes parsing edges from the node including the second network metadata to the node including the first network metadata. In yet another example, identifying the root cause further includes filtering the plurality of network events based on changes to the network or predicting the root cause based on previous network metadata or network events.

Yet another aspect of the disclosure provides for a non-transitory computer readable medium for storing instructions that, when executed by one or more processors, cause the one or more processors to perform operations for managing a network using a behavior model, the operations including: receiving first network metadata; comparing the first network metadata to test network metadata; determining that the first network metadata does not match the test network metadata; identifying second network metadata that match the test network metadata; computing a plurality of network events based on possible transitions from the first network metadata to the second network metadata; identifying a root cause for the first network metadata not matching the test network metadata based on the plurality of network events; and outputting instructions based on the root cause.

In an example, outputting instructions further includes at least one of sending an alert or notification to validate the root cause or automatically correcting the root cause.

In another example, the operations further include generating a directed graph for the behavior model, the directed graph including a plurality of nodes and a plurality of edges connecting the plurality of nodes, the plurality of nodes representing network metadata and the plurality of edges representing network events. In yet another example, computing the plurality of network events further includes parsing edges from the node including the second network metadata to the node including the first network metadata. In yet another example, identifying the root cause further includes filtering the plurality of network events based on changes to the network or predicting the root cause based on previous network metadata or network events.

DETAILED DESCRIPTION

Figure 1:
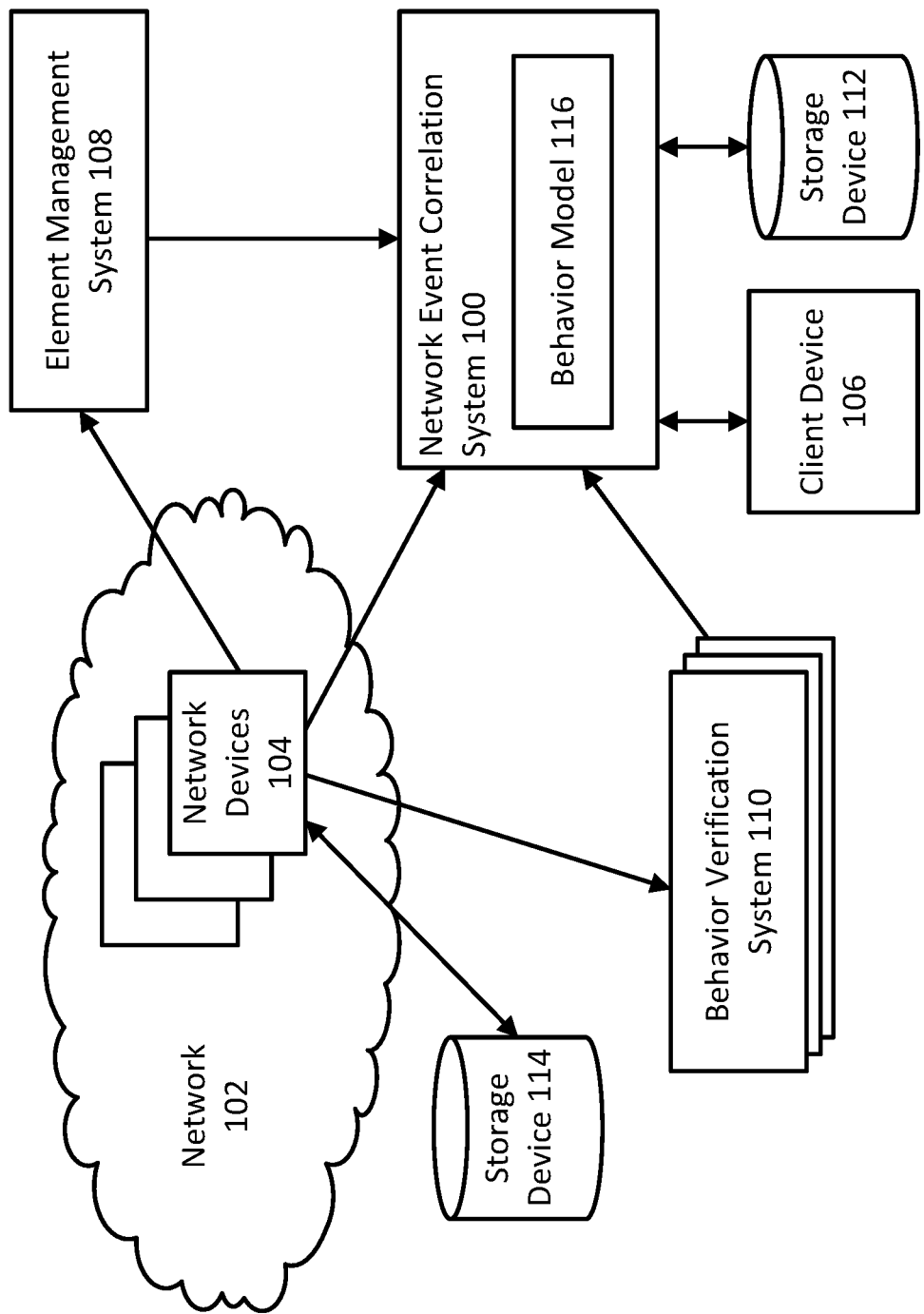
FIG. 1 depicts a block diagram of an example network event correlation system (NECS) for a network according to aspects of the disclosure.

The technology relates generally to monitoring, alerting, and/or correcting network problems based on network states and events using a network behavior model. The behavior model can learn and be updated with network states and events to correlate network problems and determine root causes of the network problems for correction. Managing the network using the network behavior model can minimize time and effort involved in identifying and correcting root causes of network problems. The behavior model can further save computing resources, such as memory usage or processing power, by more quickly identifying root causes of network problems.

A network can include a monitoring system and an alerting system. The monitoring system can monitor one or more network devices directly or through an element management system (EMS). The alerting system can create alerts based on the monitored data. If an alert is generated, a ticket or notification can be sent to a user to take action. However, alerts may not be correlated and, even if they are correlated, the alerts may be performed statically based on prior knowledge. From the alerts alone, assessing network behavior and impact can be highly difficult. Further, root cause analysis solely based on alerts can be highly difficult and time-consuming, even for simple failures. A network event correlation system (NECS) can address these difficulties.

The NECS includes a behavior model generated for the network. The behavior model can be a learning model represented as a finite state machine (FSM) or as a machine learning model. The behavior model can correlate network behavior, a state of network nodes, network events, and/or objective changes, such as configuration or security changes. The behavior model can be trained and/or updated with current and past network events, network states, and/or behavioral patterns. The NECS can receive one or more network events and a current behavior of the network as well as any objective changes for the network. The NECS can determine a root cause of the one or more network events by traversing the FSM to find the network node matching the current behavior of the network, or by predicting the root cause based on the training data using machine learning. In response to determining the root cause, the NECS can generate a ticket or alert for a user to validate the root cause and perform corrective action or, if the corrective action is known, the NECS can automatically perform the corrective action.

As an example, a root cause can be an incorrect objective update. As a result of the objective update, a port in the network can malfunction, which can further result in multiple events such as a link or protocol adjacency malfunctioning. The NECS can obtain the current behavior of the network from the behavior verification system, which can inform the NECS that traffic could not pass through the malfunctioning port. The NECS already knows the behavior of the network and the current set of events, including network events and objective events. The NECS can traverse from a start state to a state that matches the current network behavior to generate a plurality of possible events. By comparing the current events with the plurality of possible events, the NECS can narrow the plurality of possible events further. Based on this further narrowing, the NECS can determine a port malfunctioned after an objective change, and can take corrective actions, such as by reverting the objective change.

The FSM can be represented as a directed graph. Each node in the graph can capture a state and behavior of the network. The state of the network can include link state, forwarding state, and/or protocol relationship, as examples. The behavior of the network can include a set of behavioral patterns of the network for each state. Example behaviors can include ability to reach a destination, paths taken to a destination, availability of one or more services, throughput of the network, latency of the network, and/or ability to reach application or service-level objectives of the network. Each node can be referred to as a state behavior node (SBN). A network event can change the state and behavior of the network. Therefore, each edge in the graph can capture the network events. Example network events can include a link malfunctioning, a network device malfunctioning, and/or a protocol relationship malfunctioning. The edges can be directed to represent how network events can affect relationships, such as dependencies, between SBNs. The FSM can include a start node in the graph to capture network state and behavior objectives. The start node can include a desired state of network elements, such as link state, forwarding state, and/or protocol relationship, as examples. The start node can also include a desired set of behavioral patterns for the network.

The machine learning model can be any learning model trained by supervised, unsupervised, and/or semi-supervised learning. The machine learning model can be trained with network objectives as well as with known and/or current network states and behaviors. For example, for unsupervised learning, the machine learning model can be trained with network objectives and network states and behaviors as network events are occurring. As another example, for supervised learning, the machine learning model can be trained with network objectives and previous network states and behaviors resulting from previous network events.

When the network behavior model is built and/or trained, the NECS can set a current state of the network as a start node, including a start state and a start behavior pattern. A test behavior pattern for verification can initially be an empty set of behaviors. For each behavior in the start behavior pattern, if the network meets the behavior, the behavior can be added to the test behavior pattern.

If the test behavior pattern matches the current behavior pattern, no action is required. The NECS can then wait a period of time before repeating the verification.

If the test behavior pattern does not match the current behavior pattern, then the behavior pattern has changed, e.g., a problem may be occurring. The NECS then can find a next node, where the test behavior pattern matches the behavior pattern of that node by following directed edges. If the next node is found, the NECS can compute all possible paths, e.g., transitions, from the current node to the next node. This set of transitions forms the set of possible network events. The NECS can perform further filtering based on changes to network objectives and/or events from the individual network nodes at that instant in time to identify a root cause of the change in behavior pattern. The NECS can perform a mitigation step automatically based on the identified root cause. For example, if the root cause is determined to be a recent objective change, the NCES can automatically revert the objective change. The next node then becomes the current node. The NECS can save computing resources by quickly identifying root causes using the behavior model.

If the set of transitions do not cover a full list of events, such as reported by the EMS, additional events can be added to the graph or used to train the machine learning model. If the NECS cannot find the next node, a new node with corresponding states, behaviors, and events can be added to the graph or used to train the machine learning model. The NECS can compute this new node based on events reported by the EMS for individual network nodes. The behavior model of the NECS can thus learn network state and behavior.

FIG. 1 depicts a block diagram of an example network event correlation system (NECS) 100 for a network 102. The network 102 includes a plurality of interconnected network devices 104. The network devices 104 can participate in the network 102 as data sources, data destinations or data sinks, and/or intermediary devices such as switches, routers, and/or gateways propagating data from sources towards destinations through the network 102. The network devices 104 can be connected to each other within the network 102 with network links.

The network 102 can facilitate interactions and/or convey information between network devices 104. Example networks include the Internet, local networks, network fabrics, or any other local area or wide area network. The network 102 can include multiple connected sub-networks or autonomous networks. The network 102 can be a local-area network (LAN), a metropolitan area network (MAN), a wide area network (WAN), an inter-network such as the Internet, or a peer-to-peer network. Any type and/or form of data network and/or communication network can be used for the network 102. The network 102 can be public, private, or a combination of public and private.

The NECS 100 can be implemented on one or more of the network devices 104 or as one or more separate computing devices. The NECS 100 can be configured to receive input data for use in detecting correlation and/or root causes of problems in a network. For example, the NECS 100 can receive the input data as part of a call to an API exposing the NECS 100 to one or more computing devices. Input data can also be provided to the NECS 100 through a storage medium, such as remote storage 112 connected to the NECS over the network 102 and/or remote storage 114 connected to the network devices 104 over the network 102. Input data can further be provided as input through a client interface on a client computing device 106 coupled to the NECS 100. Input data can also be provided through an element management system 108, a behavior verification system 110, and/or the network devices 104 themselves. The element management system 108 can correspond to one or more computing devices that monitor the network devices 104 and report individual device events in the network 102. The behavior verification system 110 can correspond to one or more computing devices that run one or more tests to capture current behavior patterns of the network 102. While one behavior verification system 110 is shown in FIG. 1, there may be multiple instances of the behavior verification system included in the network 102. Further, while the element management system 108, behavior verification system 110, and NECS 100 are shown as separate elements, these systems can be included in the same or different computing devices within or outside of the network 102.

The input data can include data associated with detecting correlation and/or root causes of problems in the network 102. The data associated with correlation and/or root causes can include network behavior or behavior patterns, network states of one or more network devices 104, network events, and/or objective changes. Example network behaviors can include an ability to reach a destination device, paths taken to a destination device, availability of one or more services in the network, throughput of the network, latency of the network, and/or ability to achieve application or service level objectives of the network. Example network states can include a link state, a forwarding state, and/or a protocol relationship. Network events can change a state and/or behavior of the network and example network events can include a link malfunctioning, a network device malfunctioning, and/or a protocol relationship malfunctioning. Example objective changes can include configuration or security updates.

The NECS 100 can also be configured to receive training data for training one or more behavior models 116 to detect correlation and/or root causes of problems in the network 102. The training data can correspond to a machine learning task for root cause detection, such as a task performed by a neural network to detect correlation and/or root causes of problems in the network 102. The training data can be split into a training set, a validation set, and/or a testing set. An example training/validation/testing split can be an 80/10/10 splits, although any other split can be possible. The training data can include network objectives as well as previous and/or current network states, behaviors, and/or events.

The training data can be in any form suitable for training the behavior model 116, according to one of a variety of different learning techniques. Learning techniques for training the behavior model 116 can include supervised learning, unsupervised learning, and semi-supervised learning techniques. For example, the training data can include multiple training examples that can be received as input by the behavior model 116. The training examples can be labeled with a desired output for the behavior model 116 when processing the labeled training examples. The label and the model output can be evaluated through a loss function to determine an error, which can be backpropagated through the behavior model 116 to update weights for the behavior model 116.

For example, if the machine learning task is a classification task, the training examples can be network states, behaviors, and/or events labeled with correlations and/or root causes. As another example, a supervised learning technique can be applied to calculate an error between outputs, with a ground-truth label of a training example processed by the behavior model 116. Any of a variety of loss or error functions appropriate for the type of the task the model is being trained for can be utilized, such as cross-entropy loss for classification tasks, or mean square error for regression tasks. The gradient of the error with respect to the different weights of the behavior model 116 can be calculated, for example using a backpropagation algorithm, and the weights for the behavior model 116 can be updated. The behavior model 116 can be trained until stopping criteria are met, such as a number of iterations for training, a maximum period of time, a convergence within a predetermined threshold, or when a minimum accuracy threshold is met.

From the input data and/or training data, the NECS 100 can be configured to output one or more results related to correlation and/or root cause detection generated as output data. The output data can include instructions associated with an identified correlation and/or root cause of a malfunction in the network 102, such as sending an alert or notification to the client device 106 and/or automatically correcting the root cause in the network 102.

The output data can be sent for display on the client device 106, as an example. In some implementations, the NECS 100 can be configured to provide the output data as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. The NECS 100 can further be configured to forward the output data to one or more other devices configured for translating the output data into an executable program written in a computer programming language and optionally as part of a framework for detecting correlation and/or root causes of problems in the network 102. The NECS 100 can also be configured to send the output data to the storage device 112 for storage and later retrieval.

The NECS 100 can include one or more behavior models 116. The one or more behavior models 116 can be implemented as one or more computer programs, specially configured electronic circuitry, or any combination of the preceding. The one or more behavior models 116 can be configured to identify correlation and/or root causes of problems in the network 102. The one or more behavior models 116 can be learning models represented as finite state machines (FSMs) or as machine learning models, and can correlate network behavior, states of network devices, network events, and/or objective changes as well as determine root causes of one or more network events. The one or more behavior models 116 can be updated and/or trained with current and past network events, network states, and/or behavior patterns.

Figure 2:
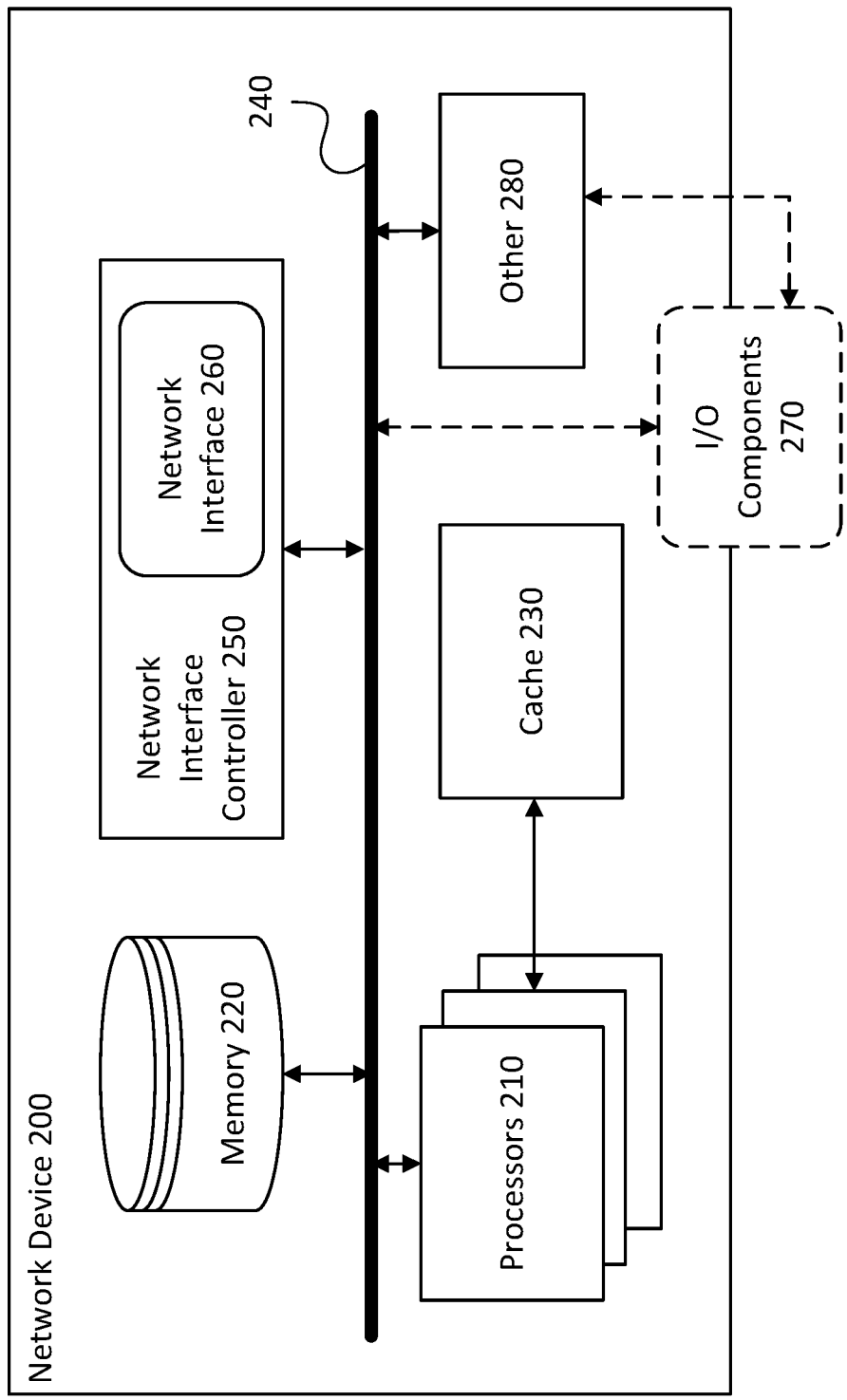
FIG. 2 depicts a block diagram of an example network device for a network according to aspects of the disclosure.

FIG. 2 depicts a block diagram of an example network device 200 for a network. The network device 200 can correspond to the one or more network devices 104 of the network 102 as depicted in FIG. 1. The network device 200 can include one or more processors 210 in communication with memory 220, at least one network interface controller 250 with a network interface port 260 for connection to a network, input/output (I/O) components 270, and other components 280. The processors 210 can be in communication with or connected to the memory 220, network interface controller 250, I/O components 270, and/or other components 280 via a bus 240. The processors 210 can incorporate or are connected to a cache memory 230. In some examples, instructions are read from the memory 220 into the cache memory 230 and executed by the processors 210 from the cache memory 230.

The processors 210 can be any logic circuitry that executes instructions fetched from the memory 7220 or cache 230. The processors 210 can be microprocessor units or special purpose processors. The network device 200 can be based on any processor, or set of processors, capable of operating as described herein. The processors 210 can be single core or multi-core processors. The processors 210 can be multiple distinct processors. The processors 210 can be implemented as circuitry on one or more chips.

The memory 220 can be any device suitable for storing computer readable data. The memory 220 can be a device with fixed storage or a device for reading removable storage media. Examples include all forms of non-volatile memory, media and memory devices, semiconductor memory devices, e.g., EPROM, EEPROM, SDRAM, and flash memory devices, magnetic disks, magneto-optical disks, and optical discs, e.g., CD ROM, DVD-ROM, or Blu-Ray® discs. The network device 200 can have any number of memory devices 220.

The cache memory 230 can be a form of computer memory placed in close proximity to the processors 210 for fast access times. The cache memory 230 can be part of, or on the same chip as, the processors 210. There can be multiple levels of cache 230, e.g., level 2 and level 3 cache layers.

The network interface controller 250 can manage data exchanges via the network interface 260. The network interface controller 250 can handle the physical and data link layers of the open systems interconnection (OSI) model for network communication. Some of the tasks of the network interface controller 250 can be handled by one or more of the processors 210. The network interface controller 250 can be incorporated into the processors 210, such as circuitry on the same chip.

The network device 200 can have multiple network interfaces 260 controlled by a single controller 250 or multiple network interface controllers 250. Each network interface 260 can be a connection point for a physical network link, e.g., a cat-5 or cat-6 Ethernet link. The network interface controller 250 can support wireless network connections and an interface port 260 can be a wireless, e.g., radio, receiver/transmitter. The network interface controller 250 can implement one or more network protocols such as Ethernet. The network device 200 can exchange data with other network devices via physical or wireless links through the network interface 260. The network interface 260 can link directly to another device or to another device via an intermediary device, e.g., a hub, a bridge, a switch, or a router, connecting the network device 200 to a data network such as the Internet.

The network device 200 can include, or provide interfaces for, one or more input or output (I/O) components 270. Input devices can include keyboards, microphones, touch screens, sensors, and pointing devices, such as a mouse or trackball, as examples. Output devices can include video displays, speakers, and printers, as examples.

Other components 280 can include an I/O interface, external serial device ports, and any additional co-processors. For example, the network device 200 can include an interface, e.g., a universal serial bus (USB) interface, for connecting input devices, output devices, or additional memory devices, e.g., portable flash drive or external media drive. The network device 200 can include an additional co-processor, such as a math co-processor to assist the processors 210 with high precision or complex calculations.

Figure 3:
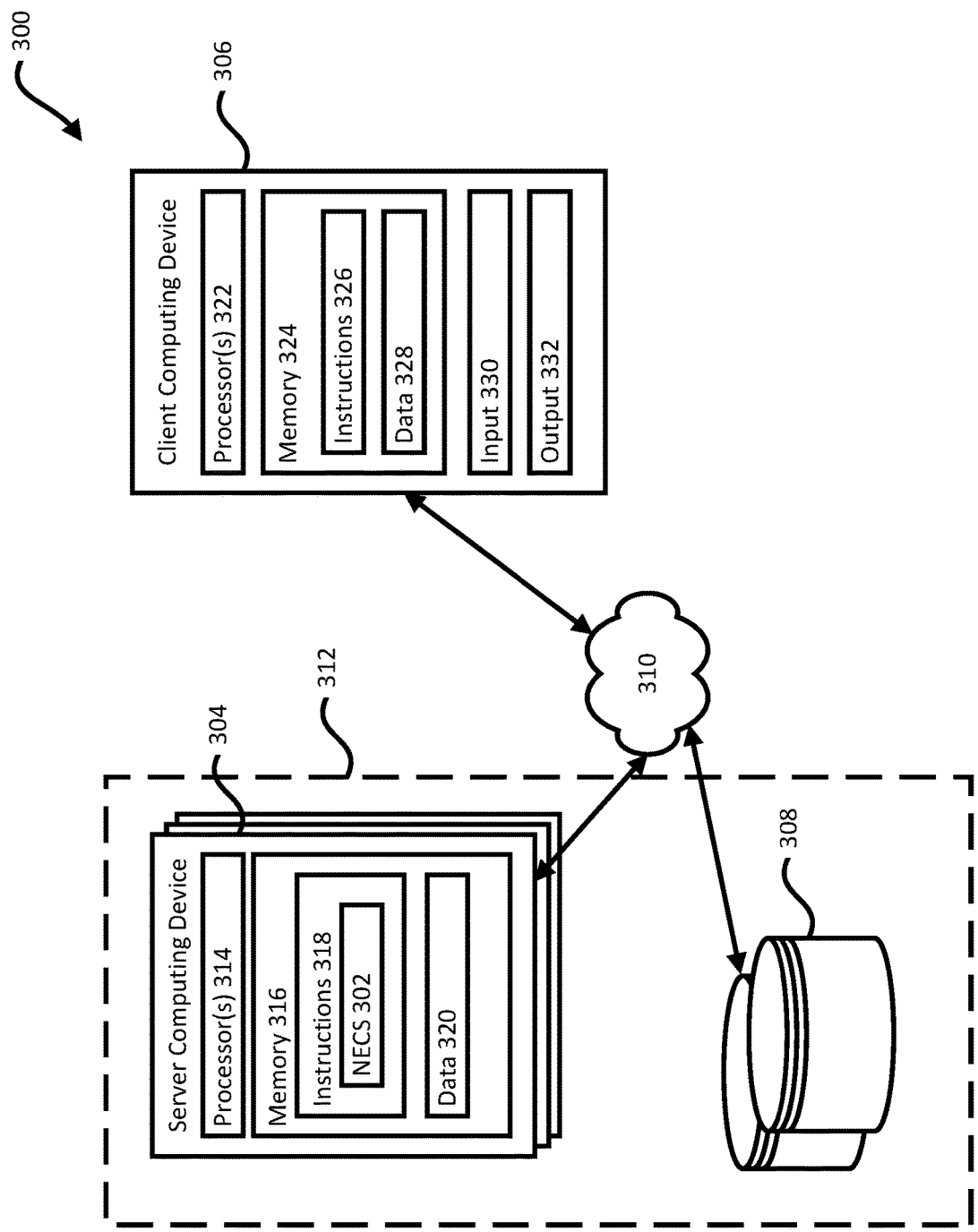
FIG. 3 depicts a block diagram of an example computing environment implementing a NECS for a network according to aspects of the disclosure.

FIG. 3 depicts a block diagram of an example computing environment 300 implementing a NECS 302 that can detect correlation and/or root causes of problems in a network. The NECS 302 can correspond to the NECS 100 for the network 102 as depicted in FIG. 1. The NECS 302 can be implemented on one or more devices having one or more processors in one or more locations, such as in a server computing device 304. A client computing device 306 and the server computing device 304 can be communicatively coupled to one or more storage devices 308 over a network 310. The server computing device 304 and the storage devices 308 can form part of a computing platform 312 for managing the network 310.

The storage devices 308 can be a combination of volatile and non-volatile memory and can be at the same or different physical locations than the computing devices 304, 306. For example, the storage devices 308 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 304 can include one or more processors 314 and memory 316. The memory 316 can store information accessible by the processors 314, including instructions 318 that can be executed by the processors 314. The memory 316 can also include data 320 that can be retrieved, manipulated, or stored by the processors 314. The memory 316 can be a type of non-transitory computer readable medium capable of storing information accessible by the processors 314, such as volatile and non-volatile memory. The processors 314 can include one or more central processing units (CPUs), graphic processing units (GPUs), field-programmable gate arrays (FPGAs), and/or application-specific integrated circuits (ASICs), such as tensor processing units (TPUs).

The instructions 318 can include one or more instructions that when executed by the processors 314, cause the one or more processors to perform actions defined by the instructions 318. The instructions 318 can be stored in object code format for direct processing by the processors 314, or in other formats including interpretable scripts or collections of independent source code modules that are interpreted on demand or compiled in advance. The instructions 318 can include instructions for implementing the NECS 302 to detect correlations and/or root causes of network problems. The NECS 302 can be executed using the processors 314, and/or using other processors remotely located from the server computing device 304.

The data 320 can be retrieved, stored, or modified by the processors 314 in accordance with the instructions 318. The data 320 can be stored in computer registers, in a relational or non-relational database as a table having a plurality of different fields and records, or as JSON, YAML, proto, or XML documents. The data 320 can also be formatted in a computer-readable format such as, but not limited to, binary values, ASCII, or Unicode. Moreover, the data 320 can include information sufficient to identify relevant information, such as numbers, descriptive text, proprietary codes, pointers, references to data stored in other memories, including other network locations, or information that is used by a function to calculate relevant data.

The client computing device 306 can also be configured similarly to the server computing device 304, with one or more processors 322, memory 324, instructions 326, and data 328. The client computing device 306 can also include a client input 330 and a client output 332. The client input 330 can include any appropriate mechanism or technique for receiving input from a client, such as keyboard, mouse, mechanical actuators, soft actuators, touchscreens, microphones, and sensors.

The server computing device 304 can be configured to transmit data to the client computing device 306, and the client computing device 306 can be configured to display at least a portion of the received data on a display implemented as part of the client output 332. The client output 332 can also be used for displaying an interface between the client computing device 306 and the server computing device 304. The client output 332 can alternatively or additionally include one or more speakers, transducers or other audio outputs, a haptic interface or other tactile feedback that provides non-visual and non-audible information to a client of the client computing device 306.

Although FIG. 3 illustrates the processors 314, 322 and the memories 316, 324 as being within the computing devices 304, 306, components described herein, including the processors 314, 322 and the memories 316, 324 can include multiple processors and memories that can operate in different physical locations and not within the same computing device. For example, some of the instructions 318, 326 and the data 320, 328 can be stored on a removable SD card and other instructions within a read-only computer chip. Some or all of the instructions 31, 326 and data 320, 328 can be stored in a location physically remote from, yet still accessible by, the processors 314, 322. Similarly, the processors 314, 322 can include a collection of processors that can perform concurrent and/or sequential operations. The computing devices 304, 306 can each include one or more internal clocks providing timing information, which can be used for time measurement for operations and programs run by the computing devices 304, 306.

The computing devices 304, 306 can be capable of direct and indirect communication over the network 310. The devices 304, 306 can set up listening sockets that may accept an initiating connection for sending and receiving information. The network 310 itself can include various configurations and protocols including the Internet, World Wide Web, intranets, virtual private networks, wide area networks, local networks, and private networks using communication protocols proprietary to one or more companies. The network 310 can support a variety of short- and long-range connections. The short- and long-range connections may be made over different bandwidths, such as 2.402 GHz to 2.480 GHz, commonly associated with the Bluetooth® standard, 2.4

GHZ and 5 GHZ, commonly associated with the Wi-Fi® communication protocol; or with a variety of communication standards, such as the LTE® standard for wireless broadband communication. The network 310, in addition or alternatively, can also support wired connections between the computing devices 304, 306, including over various types of Ethernet connection.

Although a single server computing device 304 and user computing device 306 are shown in FIG. 3, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Figure 4:
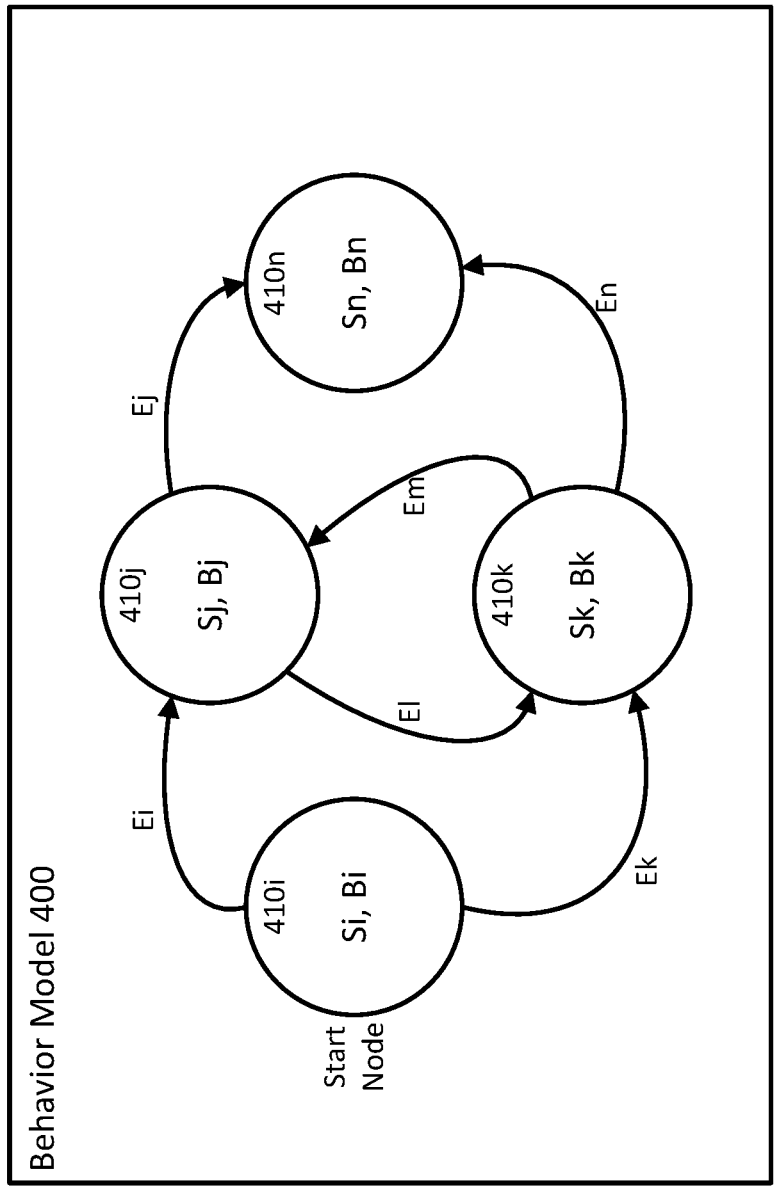
FIG. 4 depicts an example behavior model for a NECS according to aspects of the disclosure.
Figure 5:
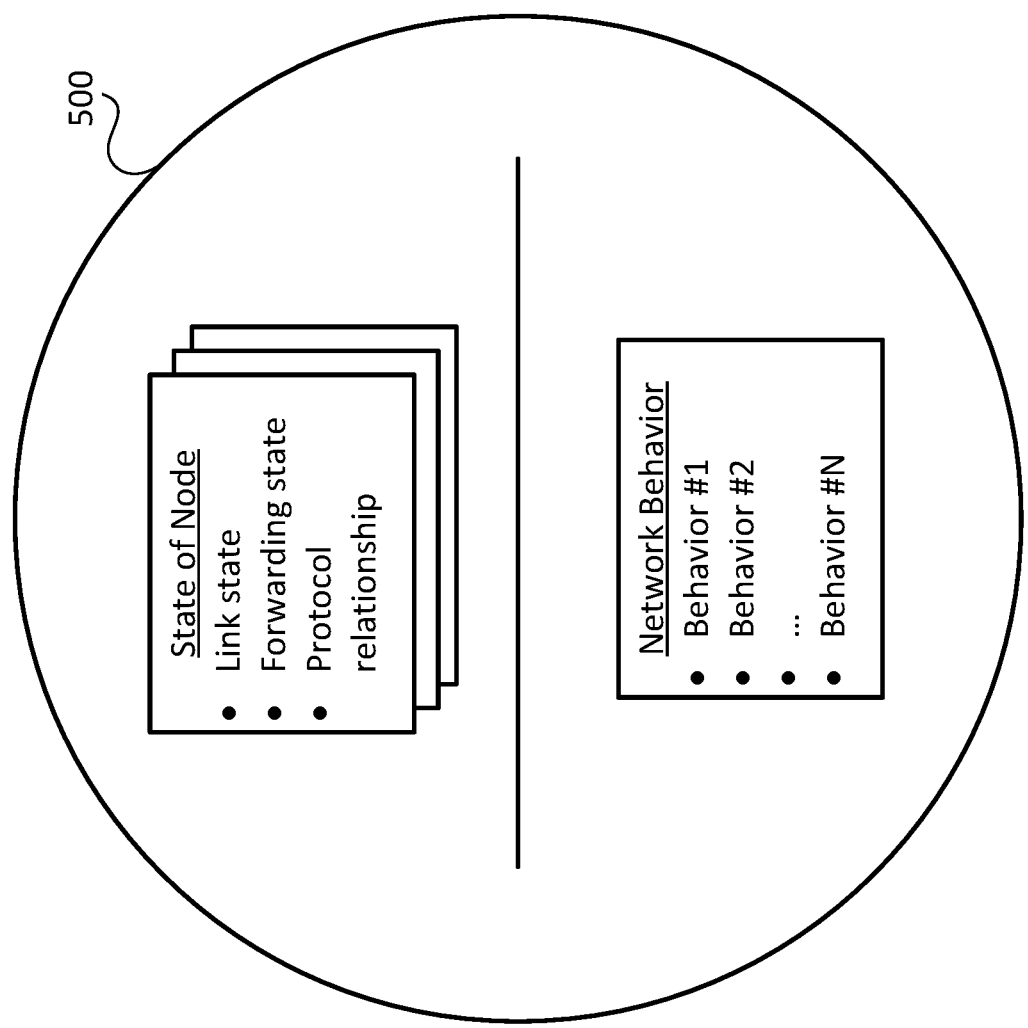
FIG. 5 depicts an example state behavior node of a behavior model according to aspects of the disclosure.

FIG. 4 depicts an example behavior model 400 for a network. The behavior model 400 can correspond to the one or more behavior models 116 of the NECS 100 as depicted in FIG. 1. The behavior model 400 can be represented as a directed graph for a finite state machine or machine learning model. The directed graph can include a plurality of nodes 410 to capture a state S and behavior B of the network. Example states of the network can include link state, forwarding state, and/or protocol relationship. Example behaviors of the network can include ability to reach a destination, paths taken to reach a destination, availability of one or more services, network throughput, network latency, and/or ability to reach application or service level objectives. The plurality of nodes 410 can be referred to as state behavior nodes (SBNs). FIG. 5 depicts an example state behavior node 500 of a behavior model for a network. The SBN 500 can correspond to any of the nodes 410 depicted in FIG. 4.

Referring back to FIG. 4, the directed graph can further include a plurality of edges E connecting the nodes 410 to capture network events that change the state and/or behavior of the network. Example network events can include a link malfunctioning, a network device malfunctioning, and/or a protocol relationship malfunctioning. The edges E can be directed to represent how the network events affect relationships between nodes 410, such as dependencies between nodes 410. The directed graph can also include a start node to capture desired network states and behaviors. The start node can include a desired set of network states and a desired set of network behaviors according to one or more objectives for the network. The directed graph can have new nodes and/or edges with corresponding new states, behaviors, and/or events added.

The behavior model 400 can correlate network states, network behavior, network events, and/or network objectives using the directed graph based on how the nodes 410 are connected by edges E. The behavior model 400 can be trained to update the directed graph with current and past network events, network states, and/or behavioral patterns to determine correlation. For example, the behavior model 400 can be trained with network objectives and network states and behaviors as network events are occurring. As another example, the behavior model 400 can be trained with network objectives and network state and behaviors resulting from previous network events. The behavior model 400 can predict or identify a root cause of one or more network events by traversing the directed graph to find the node matching the current state and behavior of the network.

Figure 6:
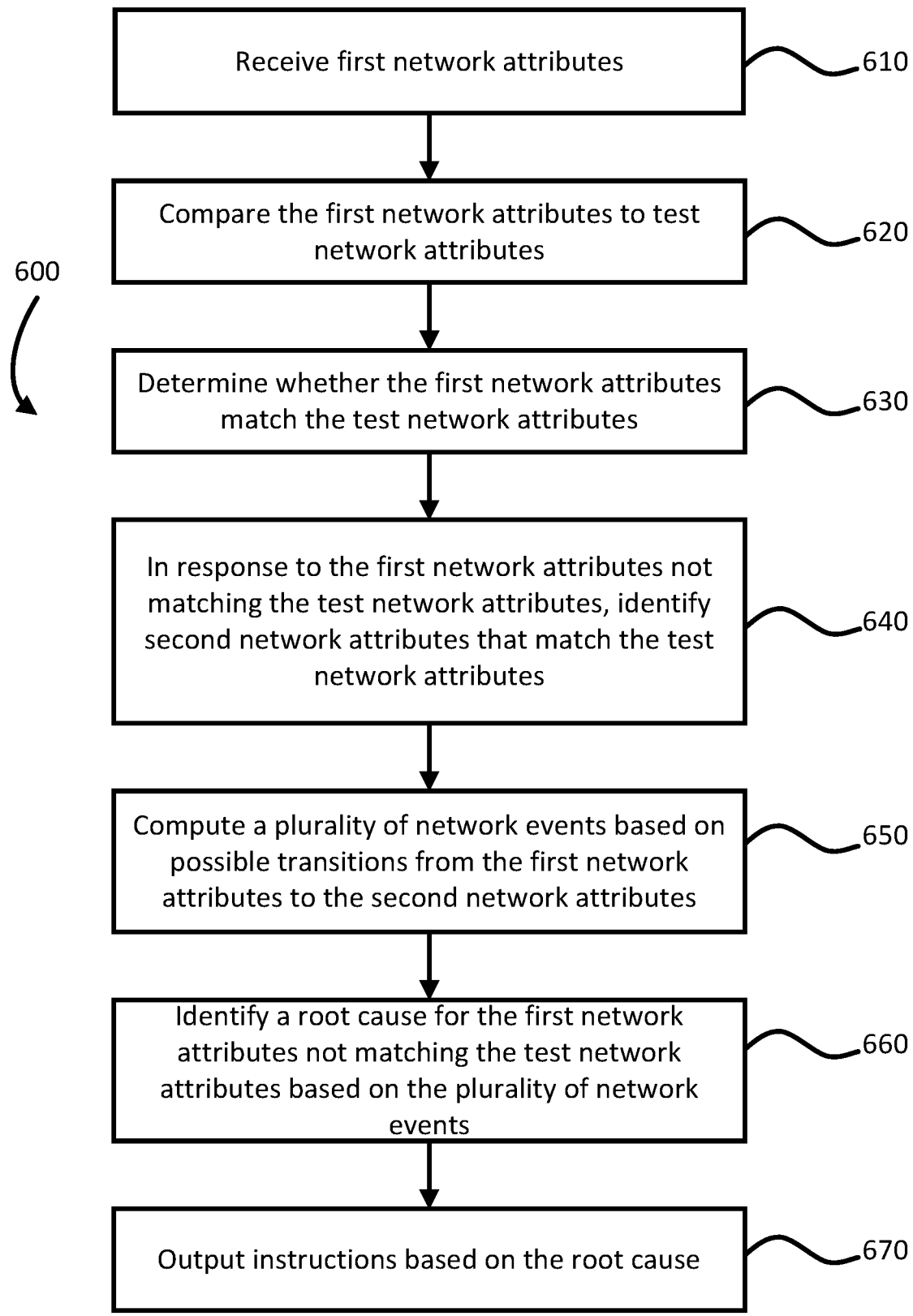
FIG. 6 depicts a flow diagram of an example process for managing a network using a NECS according to aspects of the disclosure.

FIG. 6 depicts a flow diagram of an example process 600 for managing a network by detecting and/or correcting root causes of problems in the network. The example process 600 can be performed on a system of one or more processors in one or more locations, such as the example NECS 100 as depicted in FIG. 1. Generally, the NECS 100 can receive one or more network events and a current state and behavior of the network as well as any objectives for the network. The NECS 100 can determine correlation and/or a root cause of the one or more network events by traversing the directed graph of the behavior model to identify or predict a network node matching the current state and behavior of the network. The NECS 100 can generate a ticket, alert, or notification for validating the root cause and performing corrective action or, if the corrective action is known, the NECS 100 can automatically perform the corrective action.

For example, consider a root cause to be an incorrect objective update, which causes a port in the network to malfunction, further resulting in multiple events like a link or protocol adjacency malfunction. The NECS 100 can obtain the current state and behavior of the network from a behavior verification system, which can inform the NECS 100 that traffic could not pass through the malfunctioning port. The NECS 100 already knows the states and behaviors of the network based on the directed graph of the behavior model. The NECS 100 can traverse from a start state and behavior to a state and behavior that matches the current network state and behavior to generate a plurality of possible events. The NECS 100 can compare the current events with the plurality of possible events to narrow the plurality of possible events further. From the traversing and comparing using the behavior model, the NECS 100 can determine a port malfunctioned after an objective change, and can automatically take corrective action, such as by reverting the objective change.

As shown in block 610, the NECS 100 can receive first network metadata. The first network metadata can include one or more current network states and/or behaviors. Example network states can include a link state, a forwarding state, and/or a protocol relationship. Example network behaviors can include an ability to reach a destination device, paths taken to a destination device, availability of one or more services in the network, throughput of the network, latency of the network, and/or ability to achieve application or service level objectives of the network.

As shown in block 620, the NECS 100 can compare the first network metadata to test network metadata. The test network metadata can include one or more desired network states and/or behaviors for the network. The desired network states and/or behaviors can be based on one or more objectives for the network, such as application, service level, or security configurations.

As shown in block 630, the NECS 100 can determine whether the first network metadata matches the test network metadata based on the comparison. If the first network metadata matches the test network metadata, then the NECS 100 may not perform any action. For example, the network can be performing as desired according to the test network metadata. The NECS 100 can wait a configurable period of time, such as from 30 seconds to 5 minutes, before repeating the comparison of network metadata to the test network metadata to determine whether they match.

As shown in block 640, if the first network metadata does not match the test network metadata, then network metadata may have changed to indicate a problem may be occurring with the network. In response, the NECS 100 can identify second network metadata that matches the test network metadata. The second network metadata can include one or more network states and/or behaviors that are affecting the current network states and/or behaviors of the first network metadata.

As shown in block 650, the NECS 100 can compute a plurality of network events based on possible transitions from the first network metadata to the second network metadata. The NECS 100 can parse edges of the behavior model from the node corresponding to the second network metadata to the node corresponding to the first network metadata. The edges that were parsed can correspond to the plurality of network events.

If the NECS 100 cannot identify network metadata that match the test network metadata, then the test network metadata can form new network metadata, including new network states and/or behaviors. The new network metadata can correspond to a new node in the behavior model. The NECS 100 can compute one or more new network events based on possible transitions from the first network metadata to the new network metadata. The NECS 100 can parse edges of the behavior model from the node corresponding to the new network metadata to the nodes corresponding to the first network metadata. The edges that were parsed can correspond to the plurality of network events, including new network events corresponding to edges connected to the new node.

As shown in block 660, the NECS 100 can identify a root cause for the first network metadata not matching the test network metadata based on the plurality of network events. For example, the NECS 100 can filter the plurality of network events based on changes to the network, such as objective, configuration, and/or security changes, at the time when the NECS 100 determined that the first network metadata does not match the test network metadata. As another example, the NECS 100 can predict the root cause based on previous network events, network states, network behaviors, and/or network objectives. The NECS can conserve or avoid wasting computing resources, such as memory usage or processing power, by identifying root causes of the network using the behavior model.

As shown in block 670, the NECS 100 can output instructions based on the root cause. For example, the NECS 100 can send an alert or notification to a client device for validating the root cause. As another example, the NECS 100 can automatically perform the corrective action, such as reverting an update.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

The phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for managing a network using a behavior model, comprising:
   identifying, by one or more processors, current network metadata that matches test network metadata;
   computing, by the one or more processors, a plurality of network events based on possible transitions to the current network metadata;
   identifying, by the one or more processors, a root cause of a problem in the network based on the plurality of network events; and
   outputting, by the one or more processors, instructions based on the root cause.

2. The method of claim 1, wherein the current network metadata comprises at least one of network states or behaviors at a point in time.

3. The method of claim 1, wherein the test network metadata comprises at least one of desired network states or behaviors for the network.

4. The method of claim 1, wherein outputting instructions further comprises at least one of sending an alert or notification to validate the root cause or automatically correcting the root cause.

5. The method of claim 1, wherein the behavior model comprises at least one of a finite state machine or a machine learning model.

6. The method of claim 1, further comprising generating, by the one or more processors, a directed graph for the behavior model, the directed graph comprising a plurality of nodes and a plurality of edges connecting the plurality of nodes, the plurality of nodes representing network metadata and the plurality of edges representing network events.

7. The method of claim 6, wherein identifying the root cause further comprises filtering the plurality of network events based on changes to the network.

8. The method of claim 6, wherein identifying the root cause further comprises predicting the root cause based on previous network metadata or network events.

9. The method of claim 1, further comprising training, by the one or more processors, the behavior model on previous network events, previous network metadata, and network objectives.

10. The method of claim 1, further comprising comparing, by the one or more processors, the current network metadata to the test network metadata.

11. A system comprising:
    one or more processors; and
    one or more storage devices coupled to the one or more processors and storing instructions that, when executed by the one or more processors, cause the one or more processors to perform operations for managing a network using a behavior model, the operations comprising:

identifying current network metadata that matches test network metadata;

computing a plurality of network events based on possible transitions to the current network metadata;

identifying a root cause of a problem in the network based on the plurality of network events; and outputting instructions based on the root cause.

12. The system of claim 11, wherein outputting instructions further comprises at least one of sending an alert or notification to validate the root cause or automatically correcting the root cause.

13. The system of claim 11, wherein the operations further comprise generating a directed graph for the behavior model, the directed graph comprising a plurality of nodes and a plurality of edges connecting the plurality of nodes, the plurality of nodes representing network metadata and the plurality of edges representing network events.

14. The system of claim 13, wherein identifying the root cause further comprises filtering the plurality of network events based on changes to the network.

15. The system of claim 13, wherein identifying the root cause further comprises predicting the root cause based on previous network metadata or network events.

16. A non-transitory computer readable medium for storing instructions that, when executed by one or more processors, cause the one or more processors to perform operations for managing a network using a behavior model, the operations comprising:

identifying current network metadata that matches test network metadata;

computing a plurality of network events based on possible transitions to the current network metadata;

identifying a root cause of a problem in the network based on the plurality of network events; and outputting instructions based on the root cause.

17. The non-transitory computer readable medium of claim 16, wherein outputting instructions further comprises at least one of sending an alert or notification to validate the root cause or automatically correcting the root cause.

18. The non-transitory computer readable medium of claim 16, wherein the operations further comprise generating a directed graph for the behavior model, the directed graph comprising a plurality of nodes and a plurality of edges connecting the plurality of nodes, the plurality of nodes representing network metadata and the plurality of edges representing network events.

19. The non-transitory computer readable medium of claim 18, wherein identifying the root cause further comprises filtering the plurality of network events based on changes to the network.

20. The non-transitory computer readable medium of claim 18, wherein identifying the root cause further comprises predicting the root cause based on previous network metadata or network events.

\* \* \* \* \*